(12) United States Patent  
Mullis et al.

(10) Patent No.: US 9,767,404 B2  
(45) Date of Patent: *Sep. 19, 2017

(54) RFID SWITCH TAG

(71) Applicant: NEOLOGY, INC., Poway, CA (US)

(72) Inventors: Joe Mullis, Oceanside, CA (US); Sheshi Nyalamadugu, San Diego, CA (US)

(73) Assignee: Neology, Inc., Poway, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/445,731

(22) Filed: Feb. 28, 2017

(65) Prior Publication Data

US 2017/0177988 A1 Jun. 22, 2017

Related U.S. Application Data

(63) Continuation of application No. 14/578,196, filed on Dec. 19, 2014, now Pat. No. 9,582,746, which is a continuation of application No. 14/060,407, filed on Oct. 22, 2013, now Pat. No. 8,944,337, which is a continuation of application No. 13/465,834, filed on May 7, 2012, now Pat. No. 8,561,911.

(60) Provisional application No. 61/483,586, filed on May 6, 2011, provisional application No. 61/487,372, filed on May 18, 2011.

(51) Int. Cl.
*G07B 15/06* (2011.01)
*G06K 19/077* (2006.01)

(52) U.S. Cl.
CPC . *G06K 19/07715* (2013.01); *G06K 19/07703* (2013.01); *G06K 19/07794* (2013.01)

(58) Field of Classification Search
USPC ............... 235/492; 705/7.34; 340/573.5, 5.8
See application file for complete search history.

(56) References Cited

U.S. PATENT DOCUMENTS

| | | | |
|---|---|---|---|
| 6,342,839 B1 | 1/2002 | Curkendall et al. | |
| 7,859,393 B2 | 12/2010 | Suzuki et al. | |
| 2003/0116634 A1 | 6/2003 | Tanaka | |
| 2003/0132301 A1 | 7/2003 | Selker | |
| 2004/0188531 A1 | 9/2004 | Gengel et al. | |

(Continued)

OTHER PUBLICATIONS

European Search Report for EP Application No. 12782498.5 dated Mar. 12 2015 (6 pages).

(Continued)

*Primary Examiner* — Allyson Trail
(74) *Attorney, Agent, or Firm* — Procopio, Cory, Hargreaves & Savitch, LLP; Noel Gillespie; Francis Plati

(57) ABSTRACT

Various embodiments of RFID switch devices are disclosed herein. Such RFID switch devices advantageously enable manual activation/deactivation of the RF module. The RFID switch device may include a RF module with an integrated circuit adapted to ohmically connect to a substantially coplanar conductive trace pattern, as well as booster antenna for extending the operational range of the RFID device. The operational range of the RFID switch device may be extended when a region of the booster antenna overlaps a region of the conductive trace pattern on the RF module via inductive or capacitive coupling. The RFID switch device may further include a visual indicator displaying a first color if the RFID switch device is in an active state and/or a second color if the RFID switch device is in an inactive state.

10 Claims, 9 Drawing Sheets

(56) References Cited

U.S. PATENT DOCUMENTS

| | | |
|---|---|---|
| 2005/0038347 A1 | 2/2005 | Suzuki |
| 2005/0242950 A1 | 11/2005 | Lindsay et al. |
| 2005/0242957 A1 | 11/2005 | Lindsay et al. |
| 2007/0008140 A1 | 1/2007 | Saarisalo et al. |
| 2007/0109101 A1 | 5/2007 | Colby |
| 2007/0144662 A1 | 6/2007 | Armijo et al. |
| 2007/0285246 A1 | 12/2007 | Koyama |
| 2008/0147461 A1 | 6/2008 | Lee et al. |
| 2008/0211675 A1 | 9/2008 | Forster et al. |
| 2008/0265039 A1 | 10/2008 | Skowronek et al. |
| 2008/0308641 A1 | 12/2008 | Finn |
| 2009/0096611 A1 | 4/2009 | Jones |
| 2009/0219158 A1 | 9/2009 | Nikitin et al. |
| 2010/0079289 A1 | 4/2010 | Brandt et al. |
| 2010/0230498 A1 | 9/2010 | Atherton |
| 2010/0283690 A1 | 11/2010 | Artigue et al. |
| 2010/0302012 A1 | 12/2010 | Roesner |
| 2011/0309931 A1 | 12/2011 | Rose |
| 2012/0161937 A1 | 6/2012 | Chen |
| 2012/0217928 A1 | 8/2012 | Kulidjian et al. |
| 2012/0248929 A1 | 10/2012 | Fish et al. |

OTHER PUBLICATIONS

International Search Report received in corresponding PCTUS2014036654, mailed on Nov. 16 2012, 4 pages.

RFID SWITCH TAG

RELATED APPLICATION INFORMATION

This application is a continuation of U.S. application Ser. No. 14/578,196, entitled "RFID Switch Tag," filed Dec. 19, 2014, which is a continuation application of U.S. application Ser. No. 14/060,407, entitled "RFID Switch Tag," filed Oct. 22, 2013, now U.S. Pat. No. 8,944,337, which is a continuation of U.S. application Ser. No. 13/465,834, filed May 7, 2012, entitled "RFID Switch Tag," now U.S. Pat. No. 8,561,911, which claims the benefit of priority under 35 U.S.C. 119(e) to U.S. Provisional Application No. 61/487,372, entitled "RFID Switch Tag," filed May 18, 2011 and claims the benefit of priority under 35 U.S.C. 119(e) to U.S. Provisional Application No. 61/483,586, entitled "RFID Switch Tag," filed May 6, 2011, all of which are incorporated herein by reference as if set forth in full.

BACKGROUND

1. Field of the Invention

The embodiments described herein relate generally to the field of radio-frequency identification (RFID) devices, and more particularly, to RFID switch tags.

2. Related Art

Conventional RFID tags lack the ability to be deactivated. However, there are certain situations where it is actually desirable to have an RFID tag deactivated. For example, in the context of traveling, RFID tags will often contain sensitive personal information stored within, for instance, an e-Passport, a visa, or a national identification card. Such information may contain the traveler's name, birth date, place of birth, nationality, and/or biometric information associated with that traveler. This information is intended to be read only by customs officials or other governmental authorities when the traveler enters or exits a country. However, since the read range of RFID tags can extend up to 30 feet, since an RFID tag does not need to be directly in the line of sight of an RFID reader, this sensitive information may be read by any number of unauthorized individuals as the individual walks through a train station or an airport. Unless the traveler houses his travel documents within a Faraday shield or other type of electro-resistant casing (which most travelers do not have), the sensitive information stored within the RFID tag remains perpetually at risk of being read by these unauthorized parties.

As a second example, consider RFID tags that are installed within automobiles, where such tags are used to facilitate automatic billing for the repeated use of certain toll-roads. In some of these toll-roads, the use of a car-pool lane is considered free of charge (which may be validly used, for example, when the automobile is housing at least one passenger other than the driver). Since a driver's RFID tag may not be deactivated, however, the RFID tag may respond to an interrogation signal issued from the toll-gate even when the driver has validly used the carpool lane. The result is that the driver may be billed for using the toll-road even when such use should have been considered free of charge because of the driver's valid use of the car-pool lane.

What is needed is a system for an RFID tag that may be easily activated or deactivated. Ideally, the system should be versatile and provide a clear sensory indication of the operational status of the RFID tag (i.e., activated or deactivated).

SUMMARY

Various embodiments of the present invention are directed to RFID switch devices. Such RFID switch devices advantageously enable manual activation/deactivation of the RF module. The RFID switch device may include a RF module with an integrated circuit adapted to ohmically connect to a substantially coplanar conductive trace pattern, as well as booster antenna for extending the operational range of the RFID device. The operational range of the RFID switch device may be extended when a region of the booster antenna overlaps a region of the conductive trace pattern on the RF module via inductive or capacitive coupling. In some embodiments, all or a portion of the booster antenna may at least partially shield the RF module when the RFID switch device is in an inactive state. The RFID switch device may further include a visual indicator displaying a first color if the RFID switch device is in an active state and/or a second color if the RFID switch device is in an inactive state.

In a first exemplary aspect, an RFID device is disclosed. In one embodiment, the RFID device comprises: a booster antenna adapted to extend the operational range of the RFID device; an RF module comprising an integrated circuit and a set of one or more conductive traces, wherein at least one conductive trace of said set of one or more conductive traces is adapted to electrically couple to a coupling region of the booster antenna when the coupling region of the booster antenna is located in a first position relative to said set of one or more conductive traces; and a switching mechanism adapted to change the position of the coupling region of the booster antenna relative to the position of said at least one conductive trace.

In a second exemplary aspect, an RFID transponder is disclosed. In one embodiment, the RFID transponder comprises: a first substrate comprising a first conductive trace pattern, wherein at least a portion of the first substrate is adapted to serve as an antenna for the RFID transponder; a second substrate comprising an integrated circuit and a second conductive trace pattern, wherein at least a portion of the second conductive trace pattern is adapted to electrically couple with at least a portion of the first conductive trace pattern when the first substrate is located in a first position relative to the second substrate; and a switching mechanism adapted to switch the position of the first substrate between a first position and at least a second position.

In a third exemplary aspect, an RFID device is disclosed. In one embodiment, the RFID device comprises: a booster antenna adapted to extend the operational range of the RFID device; a first RF module comprising a first integrated circuit and a first conductive trace pattern, wherein at least a portion of the first conductive trace pattern is adapted to electrically couple to a coupling region of the booster antenna when the coupling region of the booster antenna is located in a first position relative to the first conductive trace pattern; a second RF module comprising a second integrated circuit and a second conductive trace pattern, wherein at least a portion of the second conductive trace pattern is adapted to electrically couple to the coupling region of the booster antenna when the coupling region of the booster antenna is located in a second position relative to the second conductive trace pattern; and a switching mechanism adapted to change the position of the coupling region of the booster antenna relative to the positions of said first and second RF modules.

In a fourth exemplary aspect, an RFID device is disclosed. In one embodiment, the RFID device comprises: a first booster antenna adapted to extend the operational range of a first RF module; a second booster antenna adapted to extend the operational range of a second RF module; the first RF module comprising a first integrated circuit and a first conductive trace pattern, wherein at least a portion of the first conductive trace pattern is adapted to electrically couple to a coupling region of the first booster antenna when the coupling region of the first booster antenna is located in a first position relative to the first conductive trace pattern; a second RF module comprising a second integrated circuit and a second conductive trace pattern, wherein at least a portion of the second conductive trace pattern is adapted to electrically couple to the coupling region of the second booster antenna when the coupling region of the second booster antenna is located in a second position relative to the second conductive trace pattern; and a switching mechanism adapted to change the position of the coupling region of the first booster antenna relative to the first RF module, and the position of the coupling region of the second booster antenna relative to the second RF module.

In a fifth exemplary aspect, an RFID device is disclosed. In one embodiment, the RFID device comprises: a first booster antenna adapted to extend the operational range of an RF module as used with a first RFID service; a second booster antenna adapted to extend the operational range of the RF module as used with a second RFID service; the RF module comprising an integrated circuit and a conductive trace pattern, wherein at least a portion of the conductive trace pattern is adapted to electrically couple to a coupling region of the first booster antenna when the coupling region of the first booster antenna is located in a first position relative to the conductive trace pattern; and wherein at least a portion of the conductive trace pattern is adapted to electrically couple to a coupling region of the second booster antenna when the coupling region of the second booster antenna is located in a second position relative to the conductive trace pattern; and a switching mechanism adapted to change the position of the RF module relative to the respective coupling regions of the first and second booster antennas.

Other features and advantages of the present invention should become apparent from the following description of the preferred embodiments, taken in conjunction with the accompanying drawings, which illustrate, by way of example, the principles of the invention.

BRIEF DESCRIPTION OF THE DRAWINGS

Various embodiments disclosed herein are described in detail with reference to the following figures. The drawings are provided for purposes of illustration only and merely depict typical or exemplary embodiments. These drawings are provided to facilitate the reader's understanding of the invention and shall not be considered limiting of the breadth, scope, or applicability of the embodiments. It should be noted that for clarity and ease of illustration these drawings are not necessarily made to scale.

DETAILED DESCRIPTION

Figure 1:
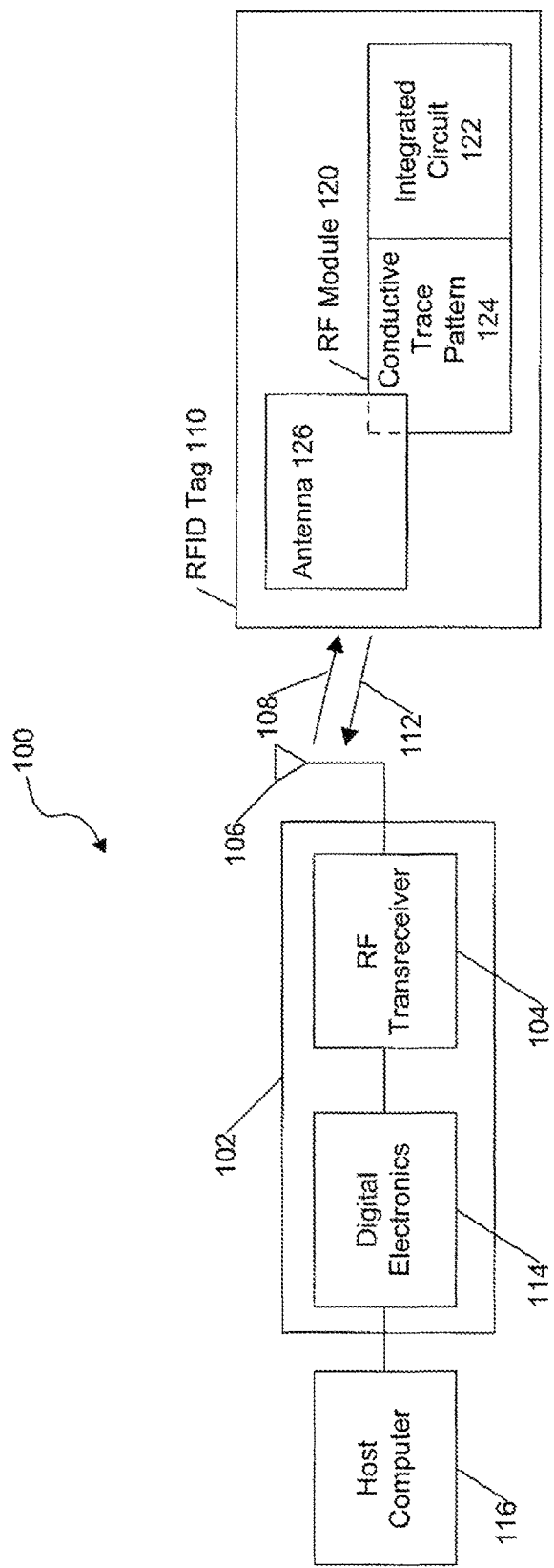
FIG. 1 is a block diagram illustrating an exemplary RFID system according to one embodiment of the present invention.

RFID is an automatic identification method, relying on storing and remotely retrieving data using devices called RFID tags or transponders. The technology relies on cooperation between an RFID reader and an RFID tag. RFID tags can be applied to or incorporated within a variety of products, packaging, and identification mechanisms for the purpose of identification and tracking using radio waves. For example, RFID is used in enterprise supply chain management to improve the efficiency of inventory tracking and management. Some tags can be read from several meters away and beyond the line of sight of the RFID reader.

Most RFID tags contain at least two parts: One is an integrated circuit for storing and processing information, for modulating and demodulating a radio-frequency (RF) signal, and for performing other specialized functions. The second is an antenna for receiving and transmitting the signal. As the name implies, RFID tags are often used to store an identifier that can be used to identify the item to which the tag is attached or incorporated. An RFID tag may also contain non-volatile memory for storing additional data as well. In some cases, the memory may be writable or electrically erasable programmable read-only memory (i.e., EEPROM).

Most RFID systems use a modulation technique known as backscatter to enable the tags to communicate with the reader or interrogator. In a backscatter system, the interrogator transmits a Radio Frequency (RF) carrier signal that is reflected by the RFID tag. In order to communicate data back to the interrogator, the tag alternately reflects the RF carrier signal in a pattern understood by the interrogator. In certain systems, the interrogator can include its own carrier generation circuitry to generate a signal that can be modulated with data to be transmitted to the interrogator.

RFID tags come in one of three types: passive, active, and semi passive. Passive RFID tags have no internal power supply. The minute electrical current induced in the antenna by the incoming RF signal from the interrogator provides just enough power for the, e.g., CMOS integrated circuit in the tag to power up and transmit a response. Most passive tags transmit a signal by backscattering the carrier wave from the reader. This means that the antenna has to be designed both to collect power from the incoming signal and also to transmit the outbound backscatter signal.

Passive tags have practical read distances ranging from about 10 cm (4 in.) (ISO 14443) up to a few meters (Electronic Product Code (EPC) and ISO 18000-6), depending on the chosen radio frequency and antenna design/size. The lack of an onboard power supply means that the device can be quite small. For example, commercially available products exist that can be embedded in a sticker, or under the skin in the case of low frequency RFID tags.

Unlike passive RFID tags, active RFID tags have their own internal power source, which is used to power the integrated circuits and to broadcast the response signal to the reader. Communications from active tags to readers is typically much more reliable, i.e., fewer errors, than from passive tags. Active tags, due to their on-board power supply, may also transmit at higher power levels than passive tags, allowing them to be more robust in "RF challenged" environments, such as high environments, humidity or with dampening targets (including humans/cattle, which contain mostly water), reflective targets from metal (shipping containers, vehicles), or at longer distances. In turn, active tags are generally bigger, caused by battery volume, and more expensive to manufacture, caused by battery price. Many active tags today have operational ranges of hundreds of meters, and a battery life of up to 10 years. Active tags can include larger memories than passive tags, and may include the ability to store additional information received from the reader, although this is also possible with passive tags.

Semi-passive tags are similar to active tags in that they have their own power source, but the battery only powers the microchip and does not power the broadcasting of a signal. The response is usually powered by means of backscattering the RF energy from the reader, where energy is reflected back to the reader as with passive tags. An additional application for the battery is to power data storage. The battery-assisted reception circuitry of semi-passive tags leads to greater sensitivity than passive tags, typically 100 times more. The enhanced sensitivity can be leveraged as increased range (by one magnitude) and/or as enhanced read reliability (by reducing bit error rate at least one magnitude).

FIG. 1 is a block diagram illustrating an exemplary RFID system according to one embodiment of the present invention. As shown by this figure, RFID interrogator 102 communicates with one or more RFID tags 110. Data can be exchanged between interrogator 102 and RFID tag 110 via radio transmit signal 108 and radio receive signal 112. RFID interrogator 102 may include RF transceiver 104, which contains both transmitter and receiver electronics configured to respectively generate and receive radio transit signal 108 and radio receive signal 112 via antenna 106. The exchange of data may be accomplished via electromagnetic or electrostatic coupling in the RF spectrum in combination with various modulation and encoding schemes.

RFID tag 110 can be a transponder attached to an object of interest and serve as an information storage mechanism. The RFID tag 110 may itself contain an RF module 120 (including an integrated circuit 122 and conductive trace pattern 124) as well as its own antenna 126. All or a portion of the antenna 126 may be adapted to interact with the conductive trace pattern 124 in order to gather energy from the RF field to enable the device circuit 122 to function. In some embodiments, the antenna 126 used to gather the RF energy may be in a different plane as that of the integrated circuit 122.

The data in the transmit signal 108 and receive signals 112 may be contained in one or more bits for the purpose of providing identification and other information relevant to the particular RFID tag application. When RFID tag 110 passes within the range of the radio frequency magnetic or electromagnetic field emitted by antenna 106, RFID tag 110 is excited and transmits data back to RF interrogator 102. A change in the impedance of RFID tag 110 can be used to signal the data to RF interrogator 102 via the receive signal 112. The impedance change in RFID tag 110 can be caused by producing a short circuit across the tag's antenna connections (not shown) in bursts of very short duration. RF transceiver 104 can sense the impedance change as a change in the level of reflected or backscattered energy arriving at antenna 106.

Digital electronics 114 (which in some embodiments comprises a microprocessor with RAM) performs decoding and reading of the receive signal 112. Similarly, digital electronics 114 performs the coding of the transmit signal 108. Thus, RF interrogator 102 facilitates the reading or writing of data to RFID tags, e.g. RFID tag 110 that are within range of the RF field emitted by antenna 104. Together, RF transceiver 104 and digital electronics 114 comprise reader 118. Finally, digital electronics 114 and can be interfaced with an integral display and/or provide a parallel or serial communications interface to a host computer or industrial controller, e.g. host computer 116.

As stated above, conventional RFID devices lack the ability to be manually activated or deactivated. Various embodiments of the present invention are therefore directed to an RFID switch tag adapted to allow a user to manually change the operational state of the RFID device by activation of a lever, switch, knob, slider, rotating member, or other similar structure.

Figure 2A:
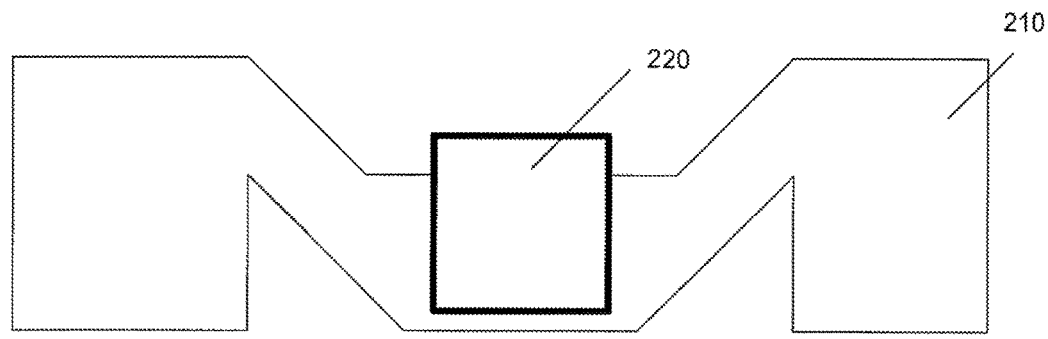
FIG. 2A is a block diagram illustrating an exemplary RFID switch tag with its RF module located in a first position relative to its booster antenna according to one embodiment of the present invention.
Figure 2B:
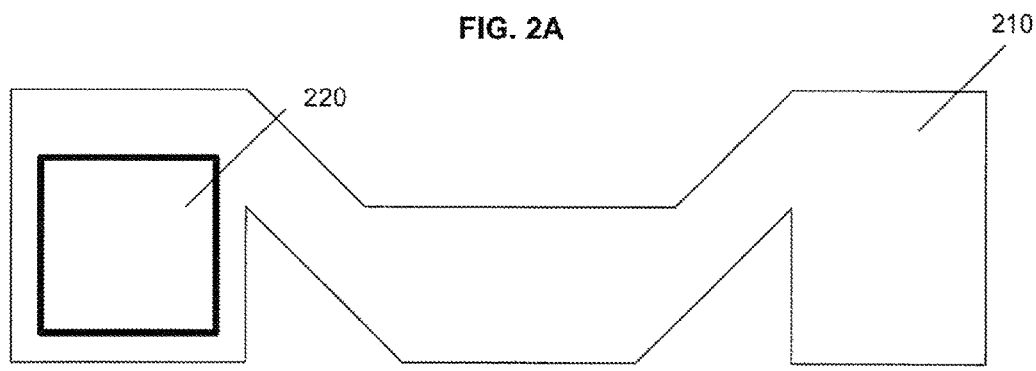
FIG. 2B is a block diagram of the exemplary RFID switch tag with its RF module located in a second position relative to its booster antenna according to the embodiment depicted in FIG. 2A.
Figure 2C:
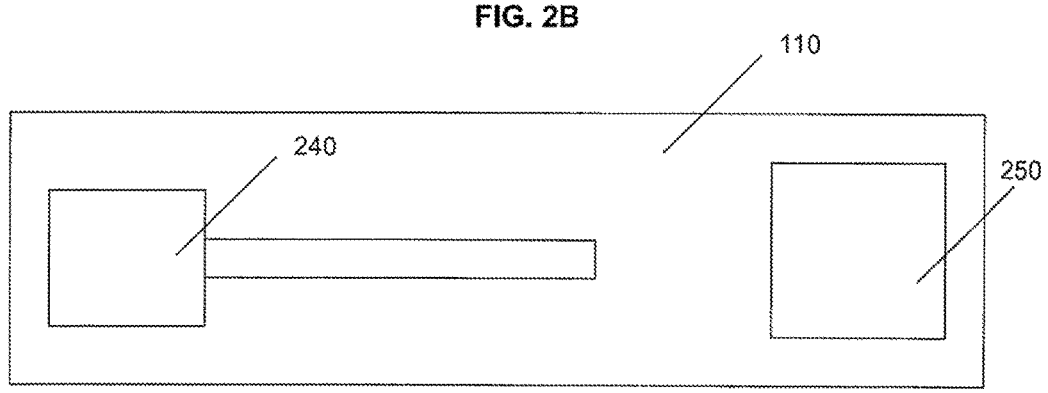
FIG. 2C is a block diagram of the RFID switch tag depicted in FIGS. 2A and 2B as depicted within an exemplary casing featuring a position-altering mechanism according to one embodiment of the present invention.

As shown generally by the embodiments depicted in FIGS. 2A-2C, a tag may provided that includes an RF module, strap, or interposer, as well as a booster antenna 210. The RF module 220 may comprise an RFID integrated circuit in an ohmic connection to impedance matched conductive trace pattern in the same plane as the integrated circuit. Even though the RF module 220 is fully functional and testable, it may have a limited range of operation due to the small surface area of the conductive trace pattern.

According to one embodiment, the operational range of the RF module 220 can be increased by conductive or inductive coupling. For example, an impedance matched booster antenna 210 can be used in conjunction with the RF module 220. In one embodiment, this booster antenna 210 consists of a conductive trace pattern on a substrate. In this example, there is no RF device on the booster antenna 210. Rather, the RF module 220 and booster antenna 210 are provided with an area where they can overlap so that the capacitive or inductive coupling of energy occurs. The RF energy gathered from the booster antenna 210 may be transferred through the RF module substrate and conducted into the RF module 220. This is illustrated in FIG. 2A. As shown, the RF module 220 may be positioned relative to the booster antenna 210 such that RF energy gathered via the booster antenna 210 is transferred to the RF module 220.

While not shown, RF module 220 may comprise an RFID integrated circuit and a conductive trace pattern. These trace patterns can then be either inductively or capacitively coupled with a booster antenna 210. For optimal performance, the booster antenna 210 may be matched with the RFID integrated circuit inputs. If RF module 220 is displaced or not sufficiently coupled with antenna 210, then the operational range of the tag can be significantly reduced.

Thus, the placement of the RF module 220 with respect to the booster antenna 210 may alter the operational range and performance of the RFID tag 110. This is illustrated in FIG. 2B. In FIG. 2B, the relative positions of the RF module 220 and the booster antenna 210 are different than the arrangement shown in FIG. 2A. In the arrangement of FIG. 2B, a smaller portion, or none, of the RF energy collected by the booster antenna 210 is transferred to the RF module 220. In this manner, the effective operational range of the RFID tag 110 may be reduced as compared to the arrangement of FIG. 2A. In fact, because RF module 220 is completely or at least partially shielded by a portion of antenna 210, RFID communications between the RFID tag 110 and the RFID reader interrogator 102 may be completely halted. This non-operational state may be useful, for instance, in situations where it is desirable to render the RFID tag 110 unresponsive to an RFID interrogation signal. For example, as noted above, when no toll is due on a toll road due to the number of passengers in the car, it may be desirable for the RFID tag 110 to be unresponsive to an RFID interrogation issued by a toll road portal system.

In some embodiments, a mechanism is provided for selectively altering the relative position of RF module 220 and the booster antenna 210. Advantageously, this allows a user to selectively displace the RF module 220 from an optimized position over the booster antenna 210 rendering it unresponsive or detuned such that it will not respond at a sufficient measurement or perform adequately. Thus, for example, when taking a toll road that is free for car-pools, a user can manipulate the mechanism in order to effectively deactivate the RFID tag 110 and avoid paying the toll. In various embodiments, the mechanism may include a switch, lever, knob, slider, rotatable member, or any other device or construction which serves this purpose.

A selectively-activatable RFID tag 110 is depicted in FIG. 2C. The RFID tag 110 may comprise a slider mechanism 240 and an indicator area 250, where the RF module 220 is mechanically coupled to the slider 240. By manipulating the slider, a user modifies the relative positions of the RF module 220 and the booster antenna 210. The indicator area 250 may provide a visual indication of the status of the RFID tag 110. For example, if the RF module 220 and booster antenna 210 are positioned for effective transfer of RF power, the indicator area 250 may present a first visual indication such as a green color. Conversely, if the RF module 220 and booster antenna 210 are not positioned for effective transfer of RF power, the indicator area may provide a second visual indication such as a red color. In this manner, one or more individuals can be alerted of the effective operability of the RFID tag 110.

Figure 3:
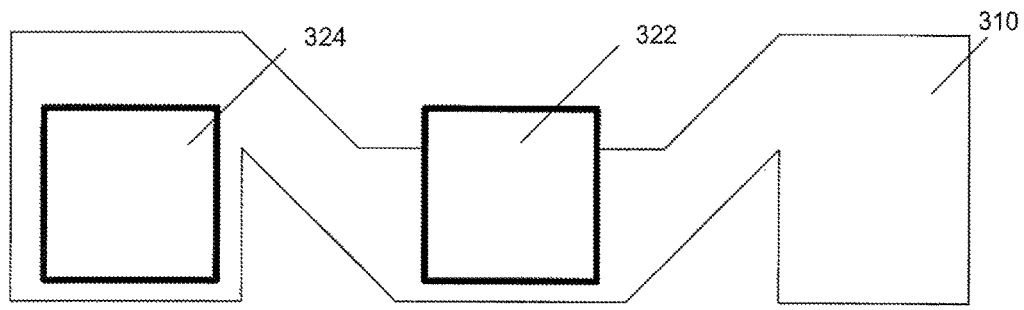
FIG. 3 is a block diagram illustrating an exemplary RFID switch tag including two RF modules and a single booster antenna according to one embodiment of the present invention.

FIG. 3 is a block diagram illustrating an exemplary RFID switch tag including two RF modules and a single booster antenna according to one embodiment of the present invention. As shown, a single booster antenna 310 is provided. However, in this embodiment two RF modules 322 and 324 are shown. The booster antenna 310 and RF modules 322 and 324 may be positioned such that only one of the two modules 322 and 324 is effectively coupled to the booster antenna 310 at any one time. For example, as shown in FIG. 3, RF module 322 is coupled to the booster antenna 310 while RF module 324 is shielded. Thus, RF module 322 is effectively tuned and responsive, while RF module 324 is effectively detuned and unresponsive.

A mechanism (e.g., switch, slider, knob, lever, rotatable member, etc.) such as the slider 240 depicted in FIG. 2C may be provided for selectively altering the relative position of RF module 322 and 324 and the booster antenna 310. In this manner, the positioning altering mechanism can be manipulated to selectively cause zero or one of the two modules 322 and 324 to be coupled to the antenna 310. For example, in a first state, only module 322 may be coupled with the booster antenna 310. In a second state, only module 324 may be coupled with booster antenna 310. In a third state, neither modules 322 or 324 are coupled with the booster antenna 310.

Advantageously, this arrangement allows a single RFID tag 110 to be used for multiple services. For example, one RF module, e.g. module 322, can be associated with toll road portal system. The other RF module, e.g., module 324, can be associated with a system for tracking car-pool lane use. The user can manipulate the position altering mechanism in order to couple the booster antenna 310 to the RF module 322 or 324 that is appropriate for current usage. In some embodiments, one or more visuals indicators may also be provided to indicate which RF module 322 or 324 is currently coupled to the booster antenna. Note also that while only two RF modules 322 and 324 are depicted in FIG. 3, any number of RF modules may be used in accordance with embodiments of the present invention.

In the embodiment of FIG. 3, the RF modules 322 and 324 may be aligned horizontally and the direction of movement caused by manipulation of the position altering mechanism may likewise be horizontal. In other embodiments, however, the RF modules 322 and 324 may be aligned vertically and the direction of movement may be vertical. In still other embodiments, the RF modules 322, 324 may be arranged in an arcuate manner and the direction of motion may also be arcuate. Various other arrangements of the RF modules 322 and 324, the booster antenna 310, and the direction of movement are also possible according to embodiments of the present invention.

Figure 4:
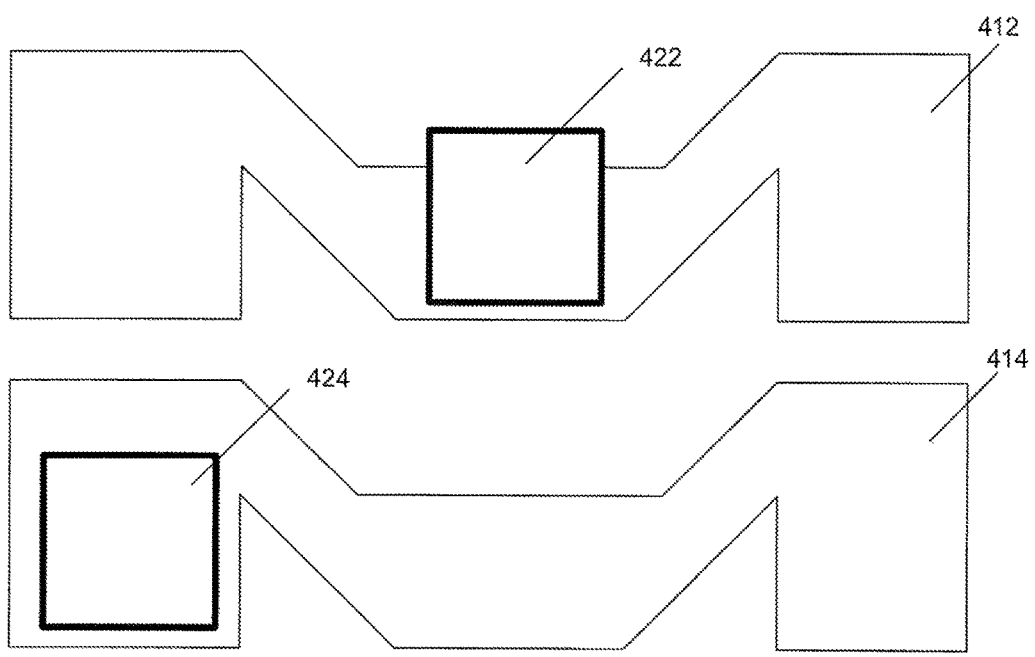
FIG. 4 is a block diagram illustrating an exemplary RFID switch tag including two RF modules and two corresponding booster antennas according to one embodiment of the present invention.

FIG. 4 is a block diagram illustrating an exemplary RFID switch tag including two RF modules and two corresponding booster antennas according to one embodiment of the present invention. As shown by the figure, two booster antennas 412 and 414 and two RF modules 422 and 424 are provided. In some embodiments, each RF module 422 and 424 may be associated with a different RFID service such that a user may independently tune each pair of RF modules 422 and 424 and booster antennas 412 and 414 present within the RFID tag 110. Note that while only two pairs of RF modules 422 and 424 and booster antennas 412 and 414 are depicted in FIG. 4, any number of RF module/booster antenna pairs may be utilized according to embodiments of the present invention.

While the embodiment depicted in FIG. 4 depicts the antennas 412 and 414 as bearing similar physical properties (such as size and shape), each booster antenna 412 and 414 may have differing physical properties according to alternative embodiments. These differences may result in different properties for gathering RF energies. In some embodiments, the antennas 412 and 414 may be specifically tuned to different frequencies.

According to some embodiments, each of the RF modules 422 and 424 may be attached to single position altering mechanism (not shown). In this manner, a user can manipulate the mechanism such that only one of the two RF modules 422 and 424 is coupled to its respective boost antenna 412 or 414 at any one time. A visual indicator may be provided to indicate which RF module 422 or 424 is currently coupled to its respective booster antenna 412 and 414. In some embodiments, the position altering mechanism may be manipulated such that both or neither of the RF modules 422 or 424 are coupled to the respective boost antennas 412 or 414 at the same time.

In other embodiments, each of the RF modules 422 and 424 may be attached to a separate position altering mechanism (not shown). According to these embodiments, both, neither, or only one of the RF modules 422 or 424 may be coupled to the respective boost antennas 412 and 414 at the same time. The visual indicator may display a first color if the first RF module 422 is active and a second color if the second RF module 424 is active.

Note that in the embodiment depicted in FIG. 4, the booster antennas 412 and 414 may be arranged along a vertical axis, and a horizontal direction of motion is utilized via manipulation of the position altering mechanism. However, persons skilled in the art will appreciate that the booster antennas 412 and 414 may be arranged horizontally, vertically, along an arc, in different planes, or in various other manners. Additionally, the direction of motion may switch the RF modules 422 and 424 between coupled and uncoupled positions for the respective booster antennas 412 and 414.

Figure 5:
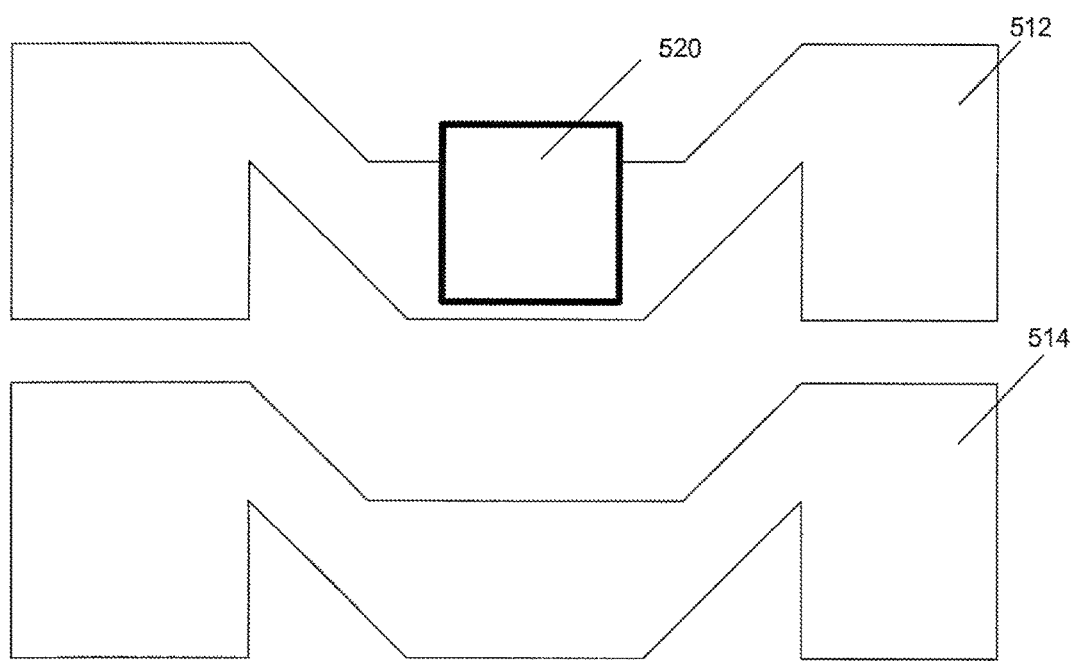
FIG. 5 is a block diagram illustrating an exemplary RFID switch tag including a single RF module and two booster antennas that are tuned to different frequencies according to one embodiment of the present invention.

FIG. 5 is a block diagram illustrating an exemplary RFID switch tag including a single RF module and two booster antennas that are tuned to different frequencies according to one embodiment of the present invention. As shown, a single RF module 520 may be provided, along with two booster antennas 512 and 514. The booster antennas 512 and 514 may be configured with different physical properties to enable the RF module 520 to switch between separate RFID services. In this respect, the RF module 520 may be mechanically coupled to a position altering mechanism such that the tag can be switched to select one or none of the booster antennas 512 and 514. A visual indicator may display a first color if the first booster antenna 512 corresponding to a first RFID service is selected and a second color if the second booster antenna 514 corresponding to a second RFID service is selected.

As in the case of FIG. 4, the booster antennas 512 and 514 may be arranged along a vertical axis and the direction of motion of the RF module 520 caused by manipulation of the position altering mechanism is vertical. In other embodiments, the booster antennas 512 and 514 may be arranged horizontally, along an arc, in different planes, or in another manner and the direction of motion is adapted to switch the RF module 520 between the booster antennas 512 and 514.

FIGS. 6A-10 generally depict various embodiments of RFID switch tags which may be utilized, for example, within an automobile setting. Each of the RFID switch tags may be affixed, fastened, or adhered to a windshield, rear-view mirror, automobile exterior, or to various other areas of the automobile according to embodiments of the present invention.

Figure 6A:
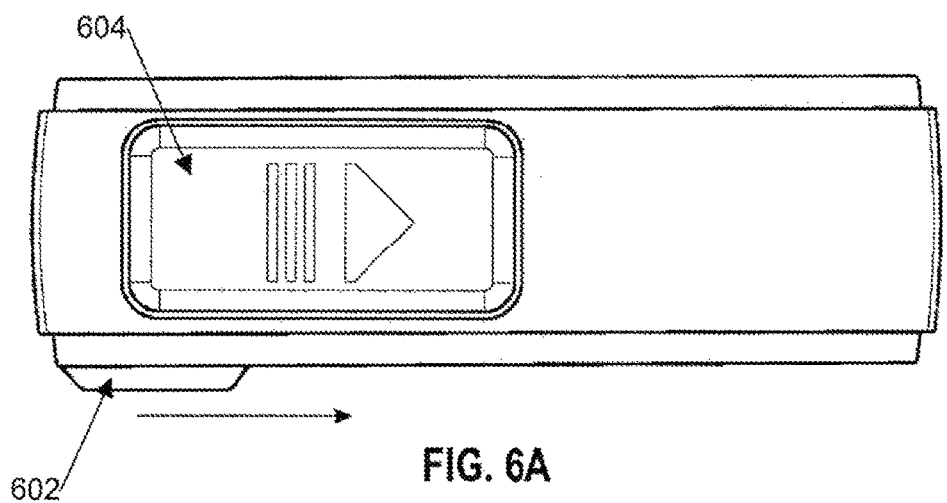
FIG. 6A is a front-side view of an exemplary switch-activated RFID tag according to one embodiment of the present invention.
Figure 6B:
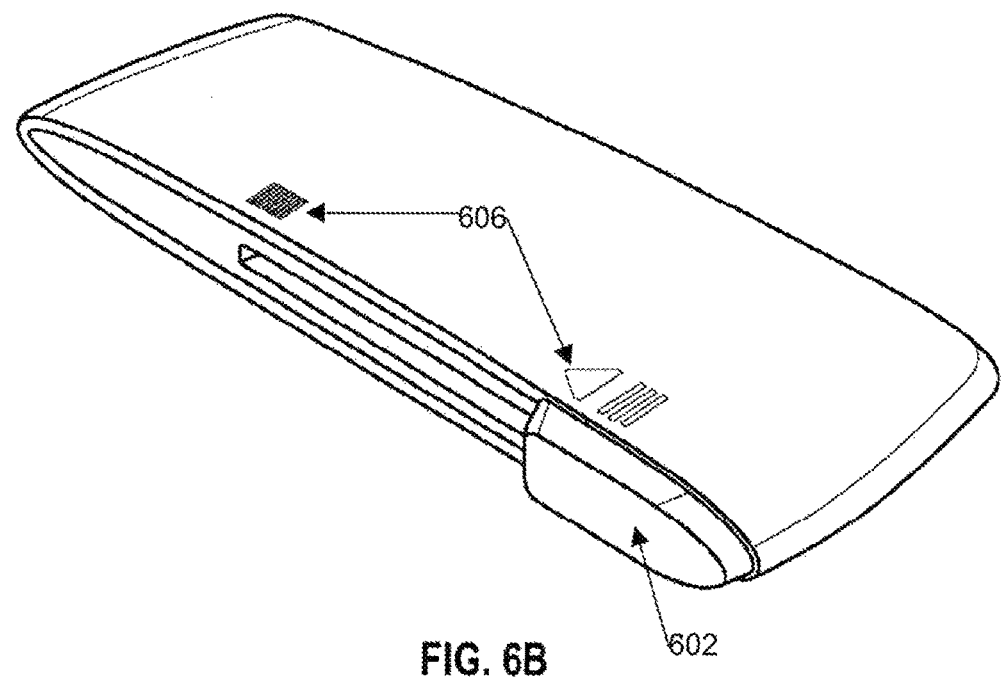
FIG. 6B is a perspective view of the back side of the exemplary switch-activated RFID tag according to the embodiment depicted in FIG. 6A.

FIG. 6A is a front-side view of an exemplary switch-activated RFID tag according to one embodiment of the present invention, while FIG. 6B is a perspective view of the back side of the exemplary switch-activated RFID tag according to the embodiment depicted in FIG. 6A. As shown by the figure, the RFID tag may include a slider configuration 602 with a window 604 on the outside and one or more icon graphics 606 on the opposite side. In some embodiments, an optional mounting component (not shown) may be used to adhere, fasten, or clip the RFID tag to a visor, for example.

Figure 7A:
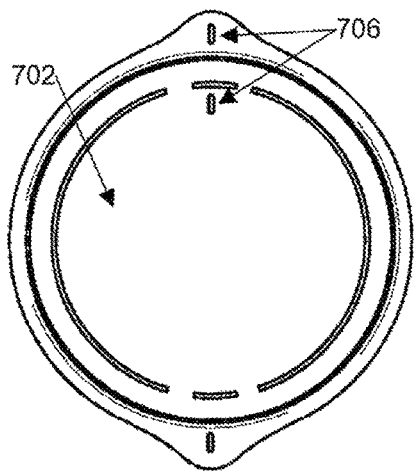
FIG. 7A is a back-side view of an exemplary circular-shaped and rotatable RFID switch tag in a first position according to one embodiment of the present invention.
Figure 7B:
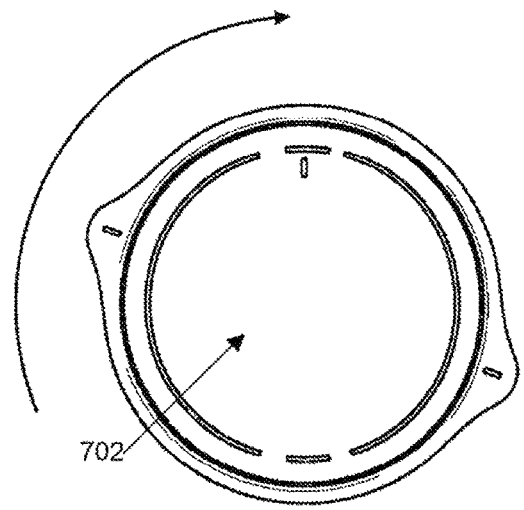
FIG. 7B is a back-side view of the exemplary circular-shaped and rotatable RFID switch tag in a second position according to the embodiment depicted in FIG. 7A.
Figure 7C:
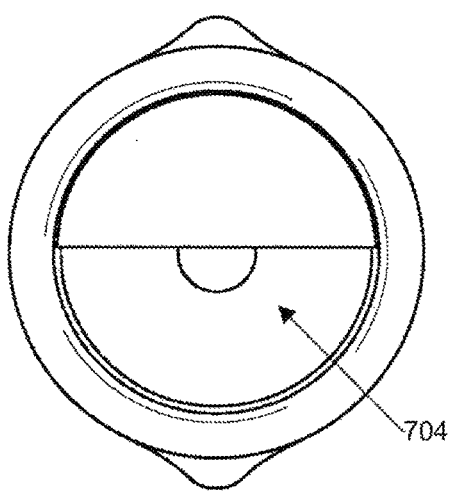
FIG. 7C is a front-side view of the exemplary circular-shaped and rotatable RFID switch tag depicted in FIGS. 7A and 7B.

FIG. 7A is a back-side view of an exemplary circular-shaped and rotatable RFID switch tag in a first position according to one embodiment of the present invention, FIG. 7B is a back-side view of the exemplary circular-shaped and rotatable RFID switch tag in a second position according to the embodiment depicted in FIG. 7A, while FIG. 7C is a front-side view of the exemplary circular-shaped and rotatable RFID switch tag depicted in FIGS. 7A and 7B. As depicted in FIGS. 7A and 7B, a circular shaped member 702 may be rotated, for example, clockwise or counterclockwise, in order to activate or deactivate the RFID switch tag. Icon graphics 706 on the back-side may be used to inform one or more individuals of the activation state of the RFID switch tag. Optionally, a window 704 on the opposite side of the RFID switch tag (see FIG. 7C) may be used to reveal the activation state of the RFID switch tag to the outside.

Figure 8A:
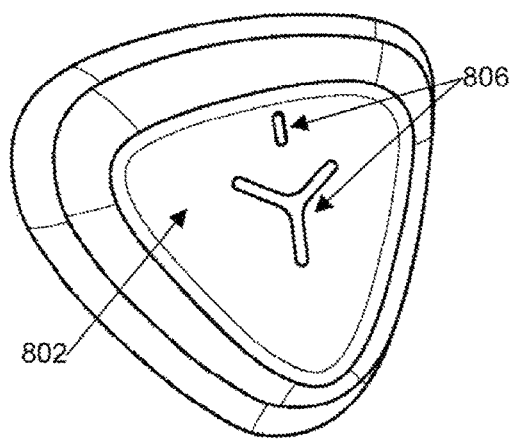
FIG. 8A is a perspective view of the back side of an exemplary triangular-shaped and rotatable RFID switch tag in a first position according to one embodiment of the present invention.
Figure 8B:
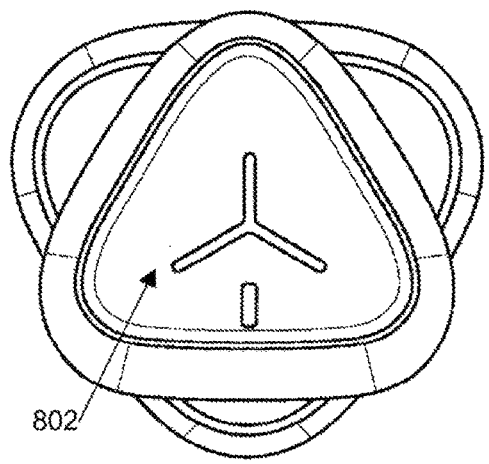
FIG. 8B is a back-side view of the exemplary triangular-shaped and rotatable RFID switch tag in a second position according to the embodiment depicted in FIG. 8A.
Figure 8C:
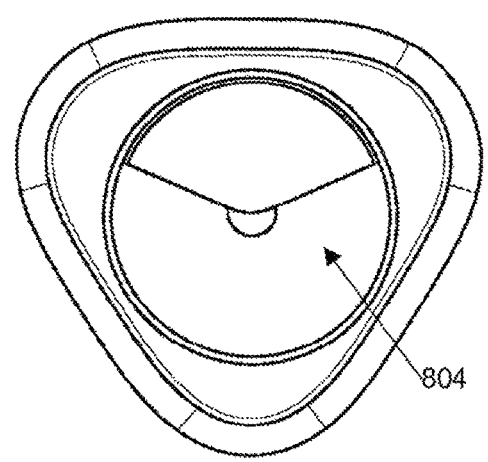
FIG. 8C is a front-side of the exemplary triangular-shaped and rotatable RFID switch tag depicted in FIGS. 8A and 8B.

FIG. 8A is a perspective view of the back side of an exemplary triangular-shaped and rotatable RFID switch tag in a first position according to one embodiment of the present invention, FIG. 8B is a back-side view of the exemplary triangular-shaped and rotatable RFID switch tag in a second position according to the embodiment depicted in FIG. 8A, while FIG. 8C is a front-side of the exemplary triangular-shaped and rotatable RFID switch tag depicted in FIGS. 8A and 8B. FIGS. 8A-8C may operate similar to FIG. 7A-7C, but utilize a substantially triangular shape and design rather than a circular one. Various other shapes and designs may also be utilized in accordance with embodiments of the present invention.

Figure 9A:
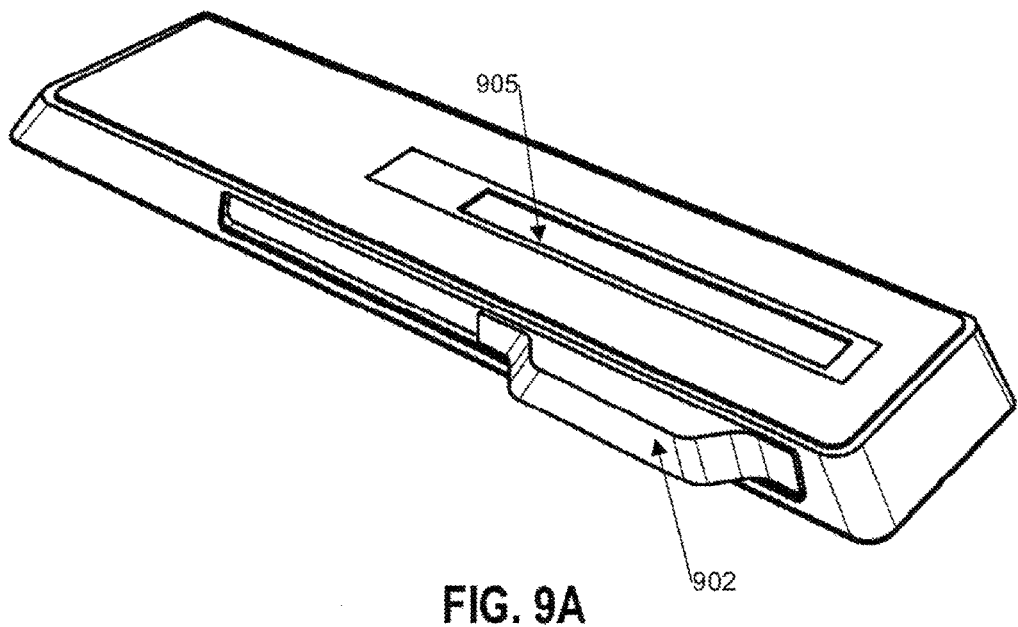
FIG. 9A is a perspective view of the back side of an exemplary switch-activated RFID tag according to one embodiment of the present invention.
Figure 9B:
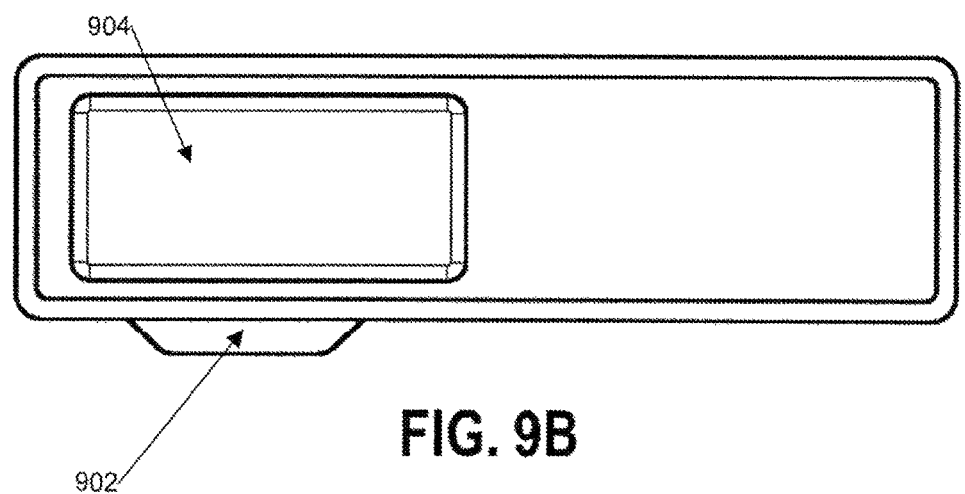
FIG. 9B is a front-side view of the exemplary switch-activated RFID tag depicted in FIG. 9A.

FIG. 9A is a perspective view of the back side of an exemplary switch-activated RFID tag according to one embodiment of the present invention, while FIG. 9B is a front-side view of the exemplary switch-activated RFID tag depicted in FIG. 9A. As depicted in FIG. 9A, the RFID tag may utilize a slider configuration 902 with a windows on both sides 904 and 905 of the RFID tag. Such an RFID tag may be adhered to the window of the automobile or may also use a cradle system for mobility according to various embodiments.

Figure 10:
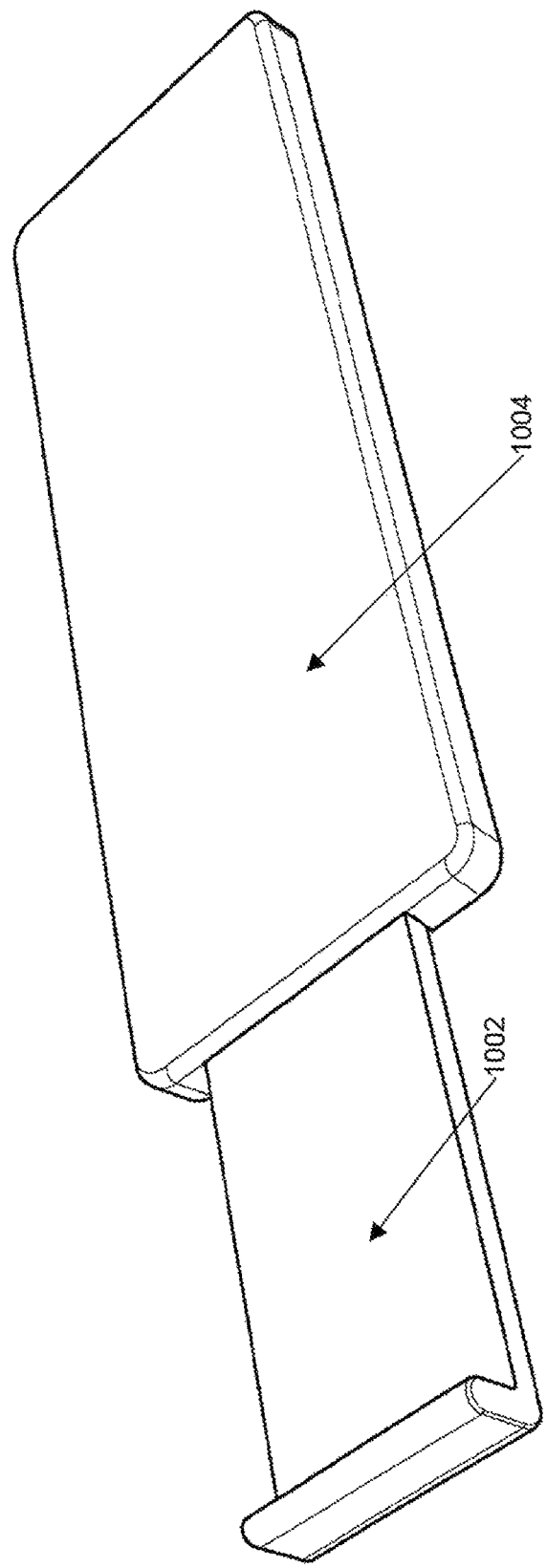
FIG. 10 is a perspective view of an exemplary slide-activated RFID tag according to one embodiment of the present invention.

FIG. 10 is a perspective view of a separate exemplary slide-activated RFID tag according to one embodiment of the present invention. According to some embodiments, no physical switch or level is utilized. Instead, the RFID tag may be activated or deactivated by manually sliding a first substrate 1002 to or from a casing 1004.

While various embodiments of the present invention have been described above, it should be understood that they have been presented by way of example only, and not of limitation. The breadth and scope of the present invention should not be limited by any of the above-described exemplary embodiments. Where this document refers to technologies that would be apparent or known to one of ordinary skill in the art, such technologies encompass those apparent or known to the skilled artisan now or at any time in the future. In addition, the invention is not restricted to the illustrated example architectures or configurations, but the desired features can be implemented using a variety of alternative architectures and configurations. As will become apparent to one of ordinary skill in the art after reading this document, the illustrated embodiments and their various alternatives can be implemented without confinement to the illustrated example. One of ordinary skill in the art would also understand how alternative functional, logical or physical partitioning and configurations could be utilized to implement the desired features of the present invention.

Furthermore, although items, elements or components of the invention may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

What is claimed is:

1. An RFID device, comprising:
   a first substrate comprising a booster antenna adapted to extend the operational range of the RFID device;
   a second substrate comprising an RF module comprising an integrated circuit and a set of one or more conductive traces, wherein at least one conductive trace of said set of one or more conductive traces is adapted to electrically couple to a coupling region of the booster antenna when the coupling region of the booster antenna is located in a first position relative to said set of one or more conductive traces; and
   a switching mechanism adapted to selectively activate and deactivate the RF module by changing the position of the coupling region of the booster antenna relative to the position of said at least one conductive trace of the RF module.

2. The RFID device of claim 1, wherein the switching mechanism is configured to translate at least one of the first substrate and the second substrate relative to the other substrate in a direction parallel to a surface of the second substrate.

3. The RFID device of claim 1, wherein the switching mechanism is configured to rotate at least one of the first substrate and the second substrate relative to the other substrate.

4. The RFID device of claim 3, further comprising:
   a housing comprising a first portion coupled to the first substrate and a second portion coupled to the second substrate, wherein the first portion is rotatable coupled to the second portion.

5. The RFID device of claim 4, wherein the first portion and the second portion are one of circular in shape and triangular in shape.

6. The RFID device of claim 1, further comprising an indicator configured to visually indicate if the RF module is activated or deactivated.

7. The RFID device of claim 6, wherein the indicator displays a first color when the RF module is activated and displays a second color when the RF module is deactivated.

8. The RFID device of claim 1, wherein the switching mechanism comprises one or more of a lever, a switch, a knob, a slider and a rotatable member.

9. The RFID device of claim 1, wherein the at least one of the one or more conductive traces is configured to capacitively couple to the coupling region of the booster antenna when the RF module is activated.

10. The RFID device of claim 1, wherein the at least one conductive trace is configured to inductively couple to the coupling region of the booster antenna when the RF module is activated.

* * * * *